United States Patent
Vilajosana et al.

(10) Patent No.: US 10,632,672 B2
(45) Date of Patent: Apr. 28, 2020

(54) TEMPERATURE CONTROL PRIOR TO FUSION

(71) Applicants: HEWLETT-PACKARD DEVELOPMENT COMPANY, L.P., Houston, TX (US); Alejandro Manuel De Pena, Sant Cugat del Valles (ES); Sergio Puigardeu Aramendia, Barcelona (ES); David Ramirez Muela, Barcelona (ES); Luis Garcia, Les Roquetes (ES)

(72) Inventors: Xavier Vilajosana, Sant Cugat del Valles (ES); Alejandro Manuel De Pena, Sant Cugat del Valles (ES); Sergio Puigardeu Aramendia, Barcelona (ES); David Ramirez Muela, Barcelona (ES); Luis Garcia, Les Roquetes (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/095,189

(22) PCT Filed: May 12, 2016

(86) PCT No.: PCT/EP2016/060698
§ 371 (c)(1),
(2) Date: Oct. 19, 2018

(87) PCT Pub. No.: WO2017/194122
PCT Pub. Date: Nov. 16, 2017

(65) Prior Publication Data
US 2019/0143586 A1    May 16, 2019

(51) Int. Cl.
G06F 19/00       (2018.01)
B29C 64/165     (2017.01)
(Continued)

(52) U.S. Cl.
CPC .......... B29C 64/165 (2017.08); B29C 64/386 (2017.08); B29C 64/393 (2017.08);
(Continued)

(58) Field of Classification Search
CPC ... B29C 64/165; B29C 64/386; B29C 64/393; B33Y 10/00; B33Y 40/00; B33Y 50/00
See application file for complete search history.

(56) References Cited

U.S. PATENT DOCUMENTS 5,772,327 A * 6/1998 Zheng .................... G01K 11/06
                                                              374/160
9,527,244 B2 * 12/2016 El-Siblani .............. B33Y 70/00
(Continued)

FOREIGN PATENT DOCUMENTS

JP       2010520091       6/2010
JP       2013043338       3/2013
(Continued)

OTHER PUBLICATIONS

Dutta, B., et al., "Additive Manufacturing by Direct Metal Deposition", Advanced Materials & Processes, May 2011, 4 pages.
(Continued)

*Primary Examiner* — Kidest Bahta
(74) *Attorney, Agent, or Firm* — HP Inc. Patent Department

(57) ABSTRACT

In an example, a method includes measuring the temperature of a fused region and the temperature of an unfused region of a first layer of build material; determining a preheating setting for a subsequent layer of build material in response to the measured temperature of the unfused region of the first layer; determining a print instruction for applying print agent to the subsequent layer of build material, wherein the application of print agent prescribed by the print instruction for the subsequent layer to cause the temperature of the
(Continued)

preheated build material to be a predetermined temperature prior to fusion in response to the measured temperature of the fused region of the first layer; forming the subsequent layer of build material; preheating the subsequent layer of build material in accordance with the preheating setting; and selectively applying the print agent onto the subsequent layer based on the print instruction.

15 Claims, 3 Drawing Sheets

(51) Int. Cl.
  *B33Y 10/00* (2015.01)
  *B33Y 50/00* (2015.01)
  *B33Y 40/00* (2020.01)
  *B29C 64/386* (2017.01)
  *B29C 64/393* (2017.01)

(52) U.S. Cl.
  CPC .............. *B33Y 10/00* (2014.12); *B33Y 40/00* (2014.12); *B33Y 50/00* (2014.12)

(56) References Cited

U.S. PATENT DOCUMENTS

| | | | |
|---|---|---|---|
| 2013/0078013 A1* | 3/2013 | Chillscyzn | G03G 15/169 399/307 |
| 2014/0141166 A1* | 5/2014 | Rodgers | C08L 77/02 427/256 |
| 2015/0021815 A1 | 1/2015 | Albrecht et al. | |
| 2015/0094837 A1 | 4/2015 | Cohen et al. | |
| 2015/0174695 A1* | 6/2015 | Elfstroem | B23K 15/0086 219/121.14 |
| 2016/0009028 A1 | 1/2016 | Tjellesen et al. | |
| 2016/0136889 A1* | 5/2016 | Rolland | C08K 5/0008 264/1.27 |
| 2016/0184893 A1* | 6/2016 | Dave | B33Y 10/00 419/53 |

FOREIGN PATENT DOCUMENTS

| | | |
|---|---|---|
| JP | 2015104837 | 6/2015 |
| JP | 2015182425 | 10/2015 |
| JP | 2017509509 | 4/2017 |
| JP | 2017530881 | 10/2017 |
| WO | WO2014184117 | 11/2014 |
| WO | WO2015108546 | 7/2015 |
| WO | WO2015108555 | 7/2015 |
| WO | WO2015108560 | 7/2015 |

OTHER PUBLICATIONS

International Search Report and Written Opinion for International Application No. PCT/EP2016/060698 dated Jan. 25, 2017, 10 pages.

* cited by examiner

TEMPERATURE CONTROL PRIOR TO FUSION

BACKGROUND

Additive manufacturing techniques may generate a three-dimensional object on a layer-by-layer basis through the solidification of a build material. In examples of such techniques, build material is supplied in a layer-wise manner and a solidification method may include heating the layers of build material to cause melting in selected regions. In other techniques, other solidification methods, such as chemical solidification methods or binding materials, may be used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a build platform and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material. For example, a coalescing agent (referred to hereinafter as a 'fusing agent') may be selectively distributed onto portions of a layer of build material in a pattern derived from data representing a slice of a three-dimensional object to be generated (which may for example be generated from structural design data). The coalescing agent may have a composition such that, when energy (for example, heat) is applied to the layer, the build material coalesces (fuses) and solidifies to form a slice of the three-dimensional object in accordance with the pattern. In other examples, coalescence may be achieved in some other manner.

In addition to a fusing agent, in some examples, a print agent may also comprise a coalescence modifying agent (referred to hereinafter as a 'detailing agent') which acts to reduce or amplify the fusion action. For example, the detailing agent may reflect incident energy so as to prevent fusion of the build material. Detailing agents may be used to control the surface finish of the object. In some examples, fusing agent and/or detailing agent may be referred to herein as agent and/or print agent.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

Figure 1:
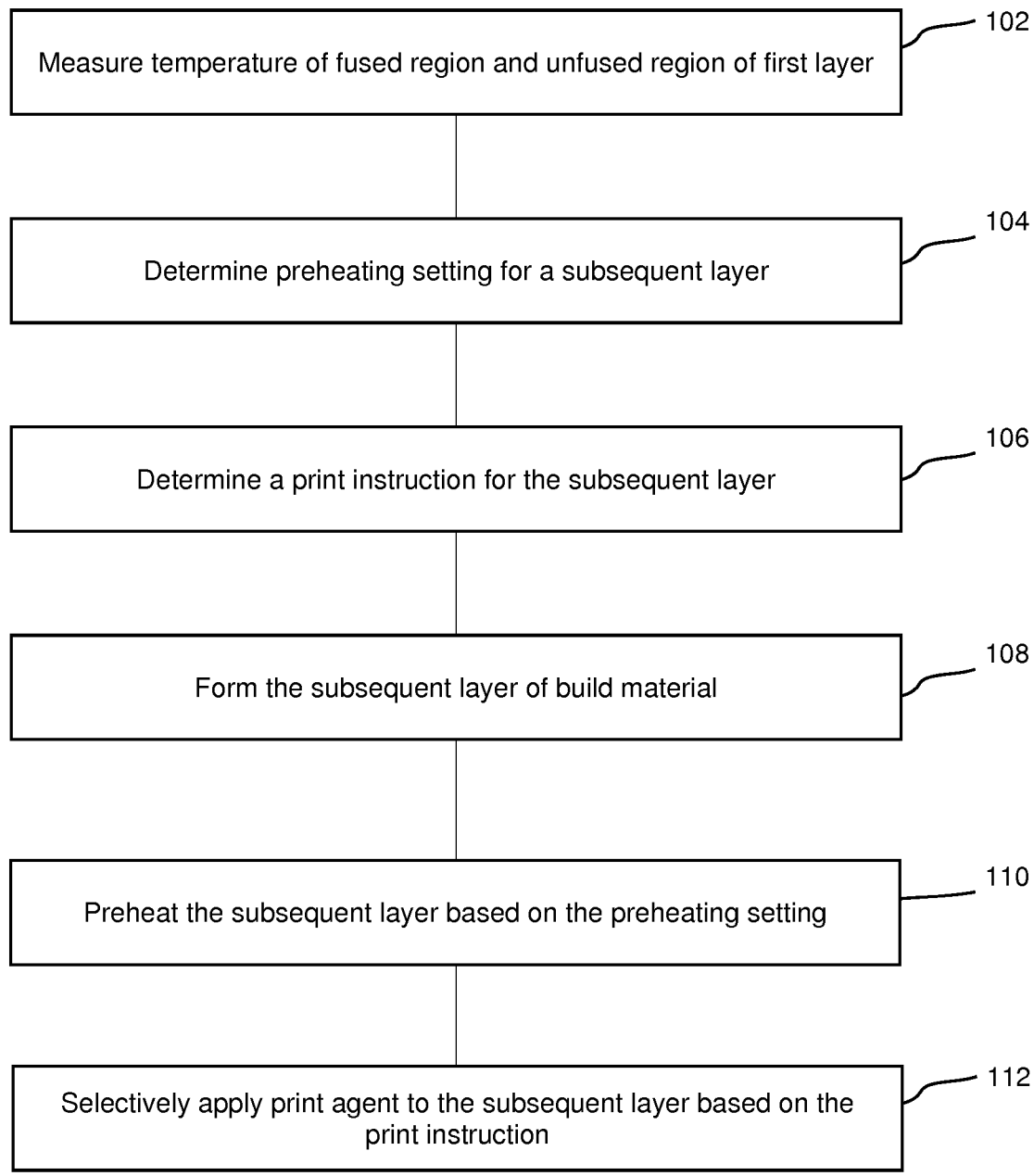
FIG. 1 is a flowchart of an example method of determining a print instruction for applying print agent.

FIG. 1 is an example of a method, which may be a method of additive manufacturing, comprising, in block 102, measuring the temperature of a fused region and the temperature of an unfused region of a first layer of build material. The first layer of build material may be provided on a build platform, either directly or overlaid on at least one previously formed layer (and in some examples, the previously formed layer may have been processed by the application of at least one print agent, and irradiated with energy from an energy source, for example, a heat lamp).

In some examples, a plurality of temperatures over the surface of the first layer of build material may be measured to form a temperature distribution profile. For example, the first layer of build material may be considered as a plurality of pixels, and each of a plurality of the pixels may be associated with a temperature measurement. In one example, the pixels may be in the order of 1-2 cm in length, dividing a build platform of around 30 cm by 30 cm into around a 32×32 matrix of pixels, although larger or smaller pixels could be formed. In some examples, the temperature of the first layer may be measured following processing thereof. The temperature may be measured using any type of temperature sensor(s). In some examples the temperature may be measured using a thermal imaging camera, or an Infra-red (IR) camera. The locations of the fused region and the unfused region may, for example, be determined based on the object model data or identified from the measured temperatures.

Block 104 comprises determining a preheating setting for a subsequent layer of build material in response to the measured temperature of the unfused region of the first layer. The preheating setting determined in block 104 may be modified from that applied to the first layer in response to the measured temperature of the unfused region of the first layer. The build material may be preheated using an array of preheating lamps provided over the build platform. The preheating setting dictates a preheating temperature for the build material. The preheating temperature is set to be below the fusion temperature of the build material such that the build material does not fuse. However, by preheating the build material, the additional energy required in order to raise the temperature of the build material from the preheating temperature to the fusion temperature in order to fuse the build material is reduced. The array of preheating lamps may operate uniformly such that they each output the same power in order to ensure that the build material within the layer is at a homogeneous temperature. The power output by the preheating lamps may be controlled using pulse-width modulation (PWM) which is set to provide the desired level of preheating. The preheating setting may therefore be a duty cycle of the preheating lamps. Accordingly, in some examples, preheating a layer of build material may comprise temporarily applying energy to such layer with at least one energy source as described herein. In some examples, the preheating setting may be used to adjust the power of the preheating lamps by changing the PWM duty cycle so as to raise or lower the temperature of the build material. For example, if the measured temperature of the unfused region of the first layer is higher than anticipated, then the duty cycle may be reduced in order to reduce the temperature of the unfused region. This avoids the unfused region being inadvertently fused when the output of the preheating lamps does not correlate with that expected. Conversely, if the measured temperature of the unfused region of the first layer is lower than anticipated, then the duty cycle may be increased in order to increase the temperature of the unfused region. This therefore minimises the energy required to cause fusion of the build material in the subsequent layer. Differences in the measured temperature of the unfused region versus the anticipated temperature may result from changes which occur during the time it takes to print the object. For example, the ambient temperature may change or the output of the preheating lamps may change as they age. The preheating lamps may be controlled based on a comparison of the measured temperature versus a preset temperature and using a suitable control method such as Proportional-Integral-Derivative (PID) control, machine learning algorithms, proportional control, etc. The temperature of the unfused region may be measured at various positions and the operation of each of the preheating lamps adjusted to account for offsets in the power output of the lamps.

Block 106 comprises determining a print instruction for applying print agent to the subsequent layer of build material. The print instruction may be derived from object model data representing an object to be generated. Such object model data may, for example, comprise a Computer Aided Design (CAD) model, and/or may, for example, be a STereoLithographic (STL) data file, and may, for example, specify a material distribution (e.g. identifying the solid portions) in a 'slice' of the object. The application of print agent prescribed by the print instruction for the subsequent layer is to cause the temperature of the preheated build material to be a predetermined temperature prior to fusion in response to the measured temperature of the fused region of the first layer. In some examples, the application of a print agent to the build material may cause the build material to be temporarily cooled below the preheating temperature through convective heat transfer with the print agent. If the print agent is applied sufficiently before the fusion stage, then the build material may return to the preheating temperature. However, if the print agent is applied immediately prior to fusion, then the temperature may not have sufficient time to recover to the preheating temperature. It will be appreciated that the energy required to achieve fusion is dependent on the temperature of the build material. The cooling effect of the print agent can therefore be harnessed in order to provide localised variations in temperature prior to fusion. For example, the sequence of applying print agent to the layer can be configured to provide a predetermined temperature distribution profile over the surface of the subsequent layer prior to fusion. This may be used to offset variations in the temperature distribution profile measured for the first layer in block 102. For example, if the array of preheating lamps generate a portion of build material which is hotter than anticipated, possibly as a result of an abnormal lamp, then this portion may be overheated during fusion. This issue can be offset by reducing the temperature of the build material over this portion by applying the print agent at an appropriate time prior to fusion in order to achieve the desired level of cooling. For example, the print agent may be applied to this portion towards the end of the application process so that it does not have sufficient time to recover. Alternatively, where the print-agent application process is sufficiently quick, it may be necessary to apply the print agent to this portion at the beginning of the application process in order to allow sufficient time for the heat loss to occur.

Block 108 comprises forming the subsequent layer of build material. The subsequent layer of build material is laid onto the previously formed first layer.

Block 110 comprises preheating the subsequent layer of build material in accordance with the preheating setting determined in block 104.

Block 112 comprises selectively applying the print agent onto the subsequent layer based on the print instruction determined in block 106.

After the print agent has been applied to the subsequent layer, energy may then be applied to the preheated build material, for example using an energy source, to raise the temperature of the build material beyond the fusion temperature over a portion of the layer so as to form a fused region and an unfused region. This may for example comprise applying heat, for example using a heat lamp, to the layer of build material, or irradiating the layer with light, microwave energy or the like. As will be appreciated, the fused region formed by such operations may be referred to as a "part area", where the part area of each layer may correspond to a cross-section of a three-dimensional object to be formed.

In some examples, a subsequent layer of build material may be formed, for example overlying the agent treated and at least partially fused first layer, and the temperature of that subsequent layer may be measured, for example before any print agent is applied thereto.

The application of print agent may also be controlled so as to change the quantity of print agent applied across the surface of the layer in order to vary the cooling effect of the print agent. This may be achieved by combining different agents, at different ratios.

In some examples, the measured temperatures are compared with modelled anticipated temperatures. This may for example comprise comparing a measured temperature distribution profile (i.e. a thermal map) of the region or layer with a modelled temperature distribution profile, or comparing spatially aligned pixels thereof. In other examples, determining the temperature condition may comprise comparing the temperature at each of at least one location(s) or region(s) over a layer with a threshold temperature.

In some examples, there may be an initial set of print instructions associated with layers of an object to be generated, specifying amounts and/or placement of print agents for each layer. The print instructions may be derived using a thermal model of an object generation process. In practice, even if a thermal model is considered, the thermal behaviour of the layers of build material in object generation may depart from the model, for example due to variations in the thermal properties of the build material and/or print agents used (for example, build material may be recycled, and the thermal properties thereof may change over its life), environmental conditions (including ambient temperature and humidity), an incomplete model or the like. Accordingly, the initial set of print instructions may result in defects in the printed object such as unintended physical properties like brittleness, loss of strength, loss of dimensional accuracy and/or increased roughness, or variations in the appearance of an object due to overheating/under heating during object formation. The predetermined print instructions for applying print agent to the subsequent layer may therefore be modified based on the measured temperatures for the first layer, as described above.

In some examples, the subsequent layer may be treated as the first layer in FIG. 1 following fusion, and the method may be carried out in relation to each, or at least some, of the layers formed in additive manufacturing.

Figure 2A:
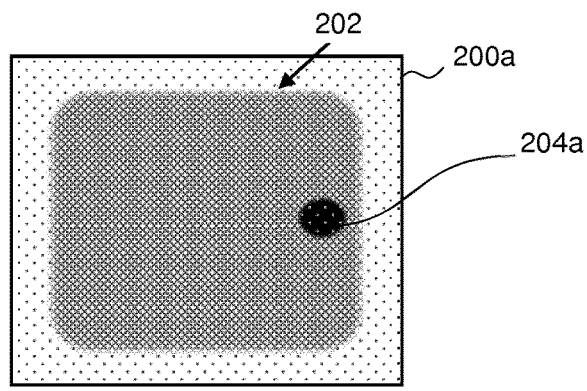
FIGS. 2a-2d are schematic diagrams of example thermal/printing maps.

FIG. 2a shows an example of temperature measurements over the surface of a layer of build material as a 'thermal map' 200a. Such a map may represent a plurality of imaging pixels, each of which is associated with a temperature measurement. In FIG. 2a, a higher temperature is indicated as a darker region, and a lower temperature is indicated as a lighter region.

FIG. 2a shows a thermal map 200a of a layer of build material which has been treated with fusing agent and heated with a heat lamp. For the purposes of this example, an object being formed in this layer comprises a rounded rectangle cross-section 202. As is shown by the darker region, the layer of build material is hotter over a portion 204 of the rectangle. It may be expected that the temperature following fusion of the layer would be uniform across the rectangle and this hotter portion 204 may be a departure from the anticipated temperatures. The hotter portion 204 may be a result of some abnormality, such as a discrepancy in the preheating lamps, energy source or build material, or any other reason. The temperature of the surrounding unfused build material is lower than in the fused region. It should be noted that, in practise, there may be more variation in temperature, which is not shown in the figures to avoid overcomplicating them.

Figure 2B:
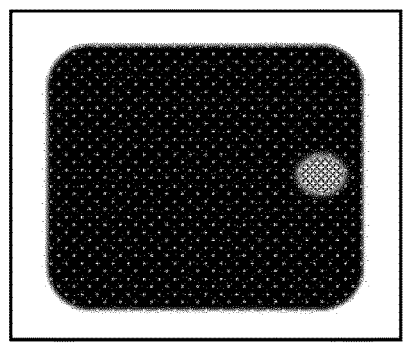

FIG. 2b shows a printing map which depicts the application of a fusing agent onto a subsequent layer of build material formed on top of the first layer shown in FIG. 2a. In this Figure, a darker region indicates a higher concentration of fusing agent, but applied at a lower volume per pixel/voxel, and a lighter region indicates a lower concentration of fusing agent, but applied at a higher volume per pixel/voxel. As shown, over the hotter portion 204 shown in FIG. 2a, the fusing agent is applied in a lower concentration, but a greater volume. The increased volume of fusing agent increases the heat dissipated from the preheated build material and the underlying fused layer. As a result, the cooling effect of the application of the fusing agent is configured to be greater over the hotter portion 204 than the remainder of the object. The application of the fusing agent is therefore configured to counteract the local variation in temperature. Although the volume of fusing agent differs across the surface of the layer, the change in concentration ensures that the effect of the fusing agent is consistent during the subsequent fusing of the layer. The fusing agent may be diluted by also applying detailing agent to the same area. The addition of detailing agent does not affect the absorption of energy during fusion, but the additional volume of the detailing agent enhances the cooling effect of the print agent. The concentration of fusing agent may therefore be adjusted by changing the ratio of fusing agent to detailing agent and these agents may be applied in distinct application steps. In particular, for a particular area of the subsequent layer, a first volume (which may instead be expressed as a flow rate, mass, concentration, etc.) of fusing agent and a second volume of detailing agent may be determined based at least in part on the measured temperatures. The volumes of fusing agent and detailing agent may be determined with reference to the predetermined temperature prior to fusion for the subsequent layer. Accordingly, block 112 of selectively applying the print agent onto the subsequent layer described previously may comprise selectively applying a first volume of fusing agent to a particular area of the subsequent layer and selectively applying a second volume of detailing agent to the particular area.

Figure 2C:
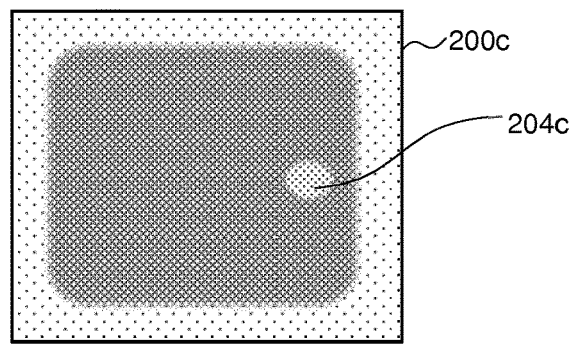

FIG. 2c shows a thermal map 200c of the subsequent layer of build material following the application of the fusing agent and immediately before fusion commences. As shown, the cooling effect of the fusing agent is such that the previously hotter portion 204a is cooled below the temperature of the surrounding build material to form a cooler portion 204c.

Figure 2D:
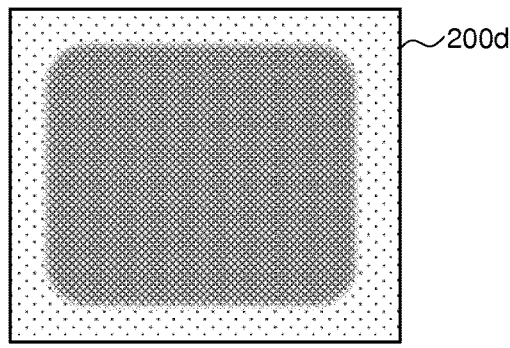

FIG. 2d shows a thermal map 200d following fusion of the subsequent layer. As shown, the localised cooler portion 204c offsets the increased heat input over this region during fusion such that the fused region has a uniform temperature.

As described previously, the application of print agent may be controlled in other ways in order to provide localised temperature variations prior to fusion. The resulting temperature also need not be uniform over the fused region and different temperature profiles may be chosen.

Figure 3:
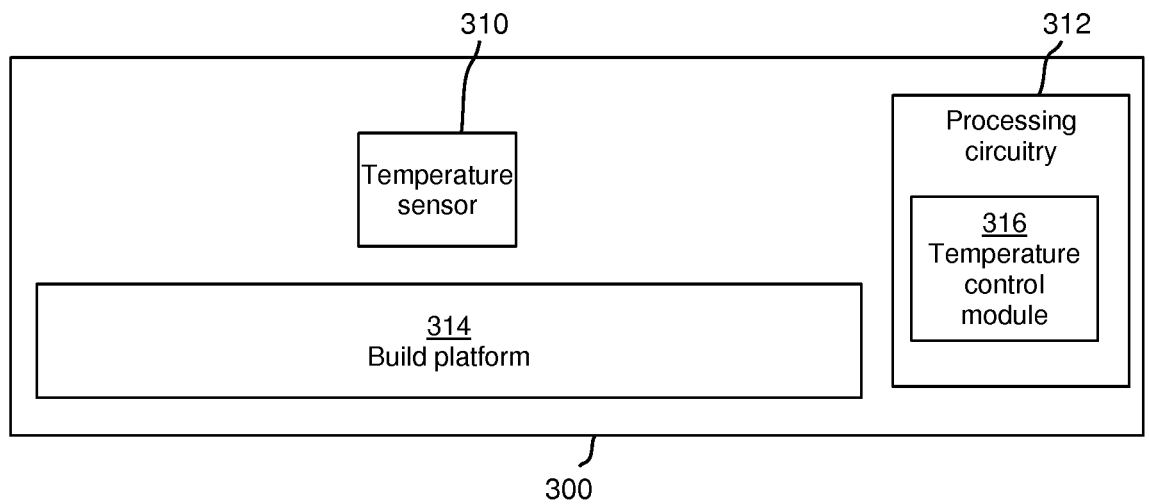
FIG. 3 is a simplified schematic drawing of an example additive manufacturing apparatus.

FIG. 3 is an example of an additive manufacturing apparatus 300 comprising a temperature sensor 310 and processing circuitry 312. A build platform, which may be a removable component (for example being provided as part of a trolley), may be provided in use of the additive manufacturing apparatus 300 to support a layer of build material. A build material distributor 302 may also be provided to form successive layers of build material on the build platform in a layer-wise additive manufacturing process. For example, the build material distributor may comprise a roller to spread build material across the build platform 314. In some examples, a removable component on which the build platform 314 is provided may also comprise a source of build material, and may comprise a mechanism to lift the build material and prepare it so the build material distributor can spread the build material on the build platform 314.

The temperature sensor 310, which may be a thermal camera, a thermal imaging array or the like, measures the temperature of a fused region and the temperature of an unfused region of a first layer of build material. In some examples, the temperature sensor 310 may measure the temperature at a plurality of locations (e.g. thermal imaging pixels) over the layer of build material. The plurality of locations may comprise a plurality of locations within the fused region and a plurality of locations within the unfused region.

The processing circuitry 312 comprises a temperature control module 316. The temperature control module 316 is configured to control the temperature of the build material of a subsequent layer prior to fusion based on the temperature of the fused region and the temperature of the unfused region of the first layer measured by the temperature sensor 310. The temperature control module 316 determines a preheating setting for the subsequent layer in response to the measured temperature of the unfused region of the first layer and determines a print instruction for applying print agent to the subsequent layer in order to cause the preheated build material to be a predetermined temperature prior to fusion in response to the measured temperature of the fused region of the first layer.

The print instruction determined by the temperature control module 316 may be used to control a print agent applicator (not shown). The print agent applicator may be controlled to selectively print the print agent onto the layer of build material on the build platform in response to the print instruction. For example, the print agent applicator may comprise a print head, such as an ink jet print head, and may apply the print agent(s) as a liquid, for example in one or more passes over the build platform.

The preheating setting determined by the temperature control module 316 may be used to control a preheating device (not shown). The preheating device preheats the layer of build material to a preheating temperature which is below a fusion temperature in accordance with the preheating setting. For example, the preheating device may comprise an array of preheating lamps which are provided over the build platform 314 to heat the build material to the preheating temperature. The apparatus may further comprise an energy source, which may be a heat lamp, which raises the temperature of the preheated build material beyond the fusion temperature over a portion of the layer so as to form the fused region and the unfused region.

The temperature control module 316 may control the preheating device so that the build material is maintained at the preheating temperature. In particular, the temperature control module 316 may ensure that the temperature of the build material does not exceed the preheating temperature so as to avoid inadvertent fusion of the build material. The temperature control module 316 may adjust the temperature of the build material prior to fusion through the application of print agent in order to correct the temperature profile of the fused region following fusion.

In some examples, the temperature control module 316 may be arranged to modify predetermined control data (i.e. preheating settings and printing instructions) in response to the measured temperatures of the fused and unfused regions.

The temperature sensor 310 may also be used in controlling other aspects of the apparatus, for example to determine when a generated object is cooled. The temperature sensor 310 may be further used to measure the temperature of other parts of an additive manufacturing apparatus, for example a temperature of a spittoon, a web wipe or of a drop detector.

Figure 4:
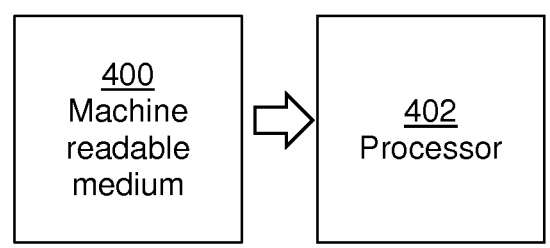
FIG. 4 is a simplified schematic drawing of an example processor associated with a machine readable medium.

FIG. 4 is an example of a machine readable medium 400 associated with a processor 402. The machine readable medium 400 comprises instructions which, when executed by the processor 402, cause the processor 402 to determine a preheating setting for a subsequent layer of build material in a layer-wise additive manufacturing process and to determine a print instruction for applying print agent to the subsequent layer. The preheating setting is determined in response to a measured temperature of an unfused region of a previous layer and the print instruction is determined in order to cause the temperature of preheated build material to be a predetermined temperature prior to fusion in response to a measured temperature of a fused region of the previous layer.

In some examples, the print instruction (and, optionally, the preheating setting) may form part of print instructions derived for the specific layer of the object being formed. Determining the control data (i.e. the preheating setting and/or print instruction) may comprise modifying predetermined control data. The predetermined control data may be generated based on a predictive thermal model for the object being formed. The measured temperatures may be compared with predicted temperatures and deviations from the predicted temperatures used to make adjustments to the control data.

The preheating setting may be a setting for an array of preheating lamps. In particular, the setting may be a duty cycle setting. The print instruction may include timing information which schedules the order in which print agents are applied prior to fusion. The print instruction may also include information regarding the print agent itself, such as volume (i.e. drop size/rate), concentration, type, etc. The print instruction may be used to change the temperature of the area prior to fusion in order to provide a desired temperature following fusion.

Where the modification of the print instruction acts on the scheduling of the application of print agents, the impact on other areas of the layer may also need to be considered. The machine readable medium 400 may therefore comprise instructions which seek an optimum solution that achieves a predetermined local temperature over a portion of the layer while minimising the effect on other areas of the layer.

In some examples, adjustment of the control data may be determined using a threshold based method or a more complex method such as a proportional-integral-derivative (PID) control based calculation or by following a statistical approach (for example based on machine learning).

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
    measuring the temperature of a fused region and the temperature of an unfused region of a first layer of build material;
    determining a preheating setting for a subsequent layer of build material in response to the measured temperature of the unfused region of the first layer;
    determining a print instruction for applying print agent to the subsequent layer of build material, wherein the application of print agent prescribed by the print instruction for the subsequent layer is to cause the temperature of the preheated build material to be a predetermined temperature prior to fusion in response to the measured temperature of the fused region of the first layer;
    forming the subsequent layer of build material;
    preheating the subsequent layer of build material in accordance with the preheating setting; and
    selectively applying the print agent onto the subsequent layer based on the print instruction.

2. A method according to claim 1, wherein the temperature of the unfused region is measured at a plurality of locations within the unfused region.

3. A method according to claim 2, wherein a preheating setting is determined for each of the plurality of locations.

4. A method according to claim 1, wherein the preheating setting is a duty cycle of a preheating lamp.

5. A method according to claim 1, wherein the measured temperature of the unfused region is compared with a predetermined preheating temperature and wherein the preheating setting for the subsequent layer is determined based on a difference between the measured temperature and the predetermined preheating temperature.

6. A method according to claim 1, wherein determining a print instruction for the subsequent layer comprises modifying a predetermined print instruction for the subsequent layer.

7. A method according to claim 1, wherein the temperature of the fused region is measured at a plurality of locations to form a temperature distribution profile, and wherein the temperature distribution profile is compared with a predicted temperature distribution profile.

8. A method according to claim 1, wherein determining a print instruction for the subsequent layer comprises determining a schedule for applying print agent to the subsequent layer to cause the temperature of the preheated build material to be the predetermined temperature prior to fusion.

9. A method according to claim 1, wherein determining a print instruction for the subsequent layer comprises determining a print agent type or composition to cause the temperature of the preheated build material to be the predetermined temperature prior to fusion.

10. A method according to claim 1, further comprising identifying the fused and unfused regions based on the temperature measurements or on a model of the object.

11. An additive manufacturing apparatus comprising:
    a temperature sensor to measure the temperature of a fused region and the temperature of an unfused region of a first layer of build material; and
    processing circuitry comprising:
        a temperature control module to control the temperature of the build material of a subsequent layer prior to fusion based on the temperature of the fused region and the temperature of the unfused region of the first layer measured by the temperature sensor;
        wherein the temperature control module determines a preheating setting for the subsequent layer in response to the measured temperature of the unfused region of the first layer and determines a print instruction for applying print agent to the subsequent layer in order to cause the preheated build material to be a predetermined temperature prior to fusion in response to the measured temperature of the fused region of the first layer.

12. An additive manufacturing apparatus according to claim 11, wherein the temperature sensor comprises a thermal imaging camera.

13. A machine readable medium comprising instructions which, when executed by a processor, cause the processor to:
    determine a preheating setting for a subsequent layer of build material in a layer-wise additive manufacturing process; and
    determine a print instruction for applying print agent to the subsequent layer;
    wherein the preheating setting is determined in response to a measured temperature of an unfused region of a previous layer and the print instruction is determined in order to cause the temperature of preheated build material to be a predetermined temperature prior to fusion in response to a measured temperature of a fused region of the previous layer.

14. A machine readable medium according to claim 13, wherein the print instruction comprises a schedule for the application of print agent over the subsequent layer of build material.

15. A machine readable medium according to claim 14, comprising further instructions which, when executed by a processor, cause the processor to: obtain an optimum schedule that provides a desired temperature distribution over the layer prior to fusion.

* * * * *